(No Model.)

J. H. HATCH.

RUBBER DAM CLAMP.

No. 376,437.  Patented Jan. 17, 1888.

WITNESSES
G. E. Harpokam
F. J. Kierce

INVENTOR
James H. Hatch

UNITED STATES PATENT OFFICE.

JAMES H. HATCH, OF SAN FRANCISCO, CALIFORNIA.

RUBBER-DAM CLAMP.

SPECIFICATION forming part of Letters Patent No. 376,437, dated January 17, 1888.

Application filed August 17, 1887. Serial No. 247,218. (No model.)

*To all whom it may concern:*

Be it known that I, JAMES HENRY HATCH, a citizen of the United States, and a resident of the city and county of San Francisco, and in the State of California, have invented certain new and useful Improvements in Rubber-Dam Clamps; and I do hereby declare that the following is a full, clear, and exact description of the invention, reference being had to the accompanying drawings, and to the letters of reference marked thereon, making a part of this specification.

My invention relates to an improved clamp or fastening for the purpose of holding a rubber dam upon the tooth while the dentist is operating thereon. This I accomplish by an improved form of clamp in which the pressure of the clamp is regulated by a set-screw under the control of the operator.

Figure 1:
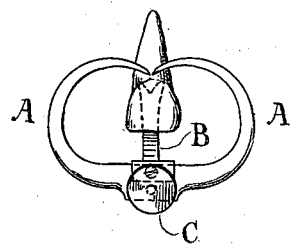
Figure 2:
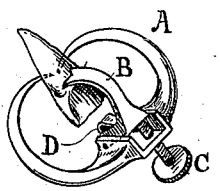
Figure 3:
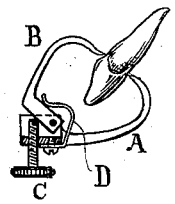

Figure 1 shows my clamp as placed on an upper tooth, front view. Fig. 2 shows my clamp, rear view. Fig. 3 shows a cross-section.

The arms or prongs A A of the clamp have small sharp points coming together and slightly bent downward toward the arm or prong B, and adapted to come in contact with the front of the tooth on top of the rubber dam to hold it down, and are sufficiently curved and far enough apart to leave plenty of space for the operator to work on the tooth between them. The arm or prong B of the clamp is likewise curved toward the point where the points of the arms or prongs A A meet, and has a sharp forked point, and is intended to engage the inside of the tooth on top of the rubber dam and hold it in place. The point might be sharp, but a forked one is better. The base and junction of the arms or prongs A A are solid and rigid, and at this point the arm or prong B unites in a hinge-joint with them. In the arms or prongs A A at their junction is placed a set-screw, C, so located that the point of the screw comes against the base of the arm B. A small spring, D, is also fastened to the arms or prongs A A at this point, and extends up and against the arm or prong B to cause the point of the arm B to separate from the points of the arms A A, when desired.

The operation of my device is as follows: A piece of rubber, called a "rubber dam," is placed on the tooth to be operated on, in the usual manner. The clamp is then placed against the tooth, with the points of the arms A A against the front of the tooth and just above the rubber dam. The operator then, with the set-screw C, forces the point of the arm B to come in contact with the tooth on the inside just above the rubber dam with sufficient contact to hold the rubber dam in place and without unnecessary pressure to cause pain. When the operation is complete, he unscrews the set-screw C, and the spring D causes the arm B to retract. My device will work without this spring D; but it works better with it, as it is adapted to retain the arm B in a fixed position.

I do not desire to confine myself to this particular form of clamp, as it is obvious that some other shape of the arms of the clamp would work equally well. My invention consists of a clamp having front arm or arms rigid, and rear arm connected thereto by a hinge-joint, all of suitable shape and adapted to be fastened on the tooth above the rubber dam by means of a set-screw or other adjustable device acting on the base of the inner arm.

Having thus described my invention, what I claim as new, and desire to secure by Letters Patent, is—

1. A clamp for fastening a rubber dam upon a tooth, consisting of the curved arms A A, rigidly united at their base and having sharp points, the curved arm B, united to the arms A A at their base by a hinge-joint, and having a sharp forked point, and the set-screw C, and the spring D, all constructed and operated substantially as described.

2. As a new article of manufacture, a clamp for fastening a rubber dam upon a tooth, consisting of rigid front arms and rear arm connected together by a hinge-joint, all of suitable shape and adapted to be fastened upon the tooth by means of a set-screw or other adjustable device acting on the base of the inner arm.

In testimony that I claim the foregoing I have hereunto set my hand this 9th day of August, 1887.

JAMES H. HATCH.

Witnesses:
G. E. HARPHAM,
F. J. KIERCE.